US007857211B2

(12) United States Patent
Nakai

(10) Patent No.: US 7,857,211 B2
(45) Date of Patent: Dec. 28, 2010

(54) INFORMATION PROCESSING SYSTEM

(75) Inventor: Yasuhiro Nakai, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 738 days.

(21) Appl. No.: 11/879,361

(22) Filed: Jul. 17, 2007

(65) Prior Publication Data

US 2008/0023544 A1 Jan. 31, 2008

(30) Foreign Application Priority Data

Jul. 27, 2006 (JP) ............................ 2006-204133

(51) Int. Cl.
*G06K 5/00* (2006.01)

(52) U.S. Cl. ........................ 235/380; 235/382; 235/487

(58) Field of Classification Search ................. 235/380, 235/382, 382.5, 487
See application file for complete search history.

(56) References Cited

U.S. PATENT DOCUMENTS

2002/0058519 A1 5/2002 Nagahara
2007/0119924 A1* 5/2007 Register et al. ............. 235/380

FOREIGN PATENT DOCUMENTS

| | | |
|---|---|---|
| JP | 08-103549 | 4/1996 |
| JP | 2001-266002 | 9/2001 |
| JP | 2002-132819 | 5/2002 |
| JP | 2004-192284 | 7/2004 |

* cited by examiner

*Primary Examiner*—Karl D. Frech
(74) *Attorney, Agent, or Firm*—David G. Conlin; Steven M. Jensen; Edwards Angell Palmer & Dodge LLP

(57) ABSTRACT

An information processing system comprises an identifying information reading portion that reads out identifying information from a recording medium storing the identifying information capable of identifying an individual, an information managing portion that in advance manages and keeps information available for information providing, an information extracting portion that extracts information from the information managing portion, based on the identifying information read out by the identifying information reading portion, and an information output portion that outputs the information extracted by the information extracting portion. The information extracting portion selects and extracts the information to be provided out of the prearranged information, based on the identifying information read out by the identifying information reading portion and acquiring conditions of the identifying information.

11 Claims, 6 Drawing Sheets

FIG. 3

INFORMATION FILE

| | |
|---|---|
| NEWSPAPER | a |
| | b |
| | c |
| BOOK | I |
| | RO |
| | HA |
| LEISURE | WEEKEND |
| | THIS MONTH |
| SIGHTSEEING | OSAKA |
| | KYOTO |
| | NARA |
| EVENT | WEEKEND |
| | THIS MONTH |
| STORE'S CAMPAIGN INFORMATION | STORE A |
| | STORE B |
| | STORE C |

INFORMATION PROCESSING SYSTEM

CROSS-NOTING PARAGRAPH

This Nonprovisional application claims priority under 35 U.S.C. §119(a) on Patent Application No. 2006-204133 filed in JAPAN on Jul. 27, 2006, the entire contents of which are hereby incorporated herein by references.

FIELD OF THE INVENTION

The present invention relates generally to an information processing system, and more particularly, to an information processing system that, by use of a medium with individual-identifiable information recorded thereon, is designed to output predetermined information according to the information read out from the medium.

BACKGROUND OF THE INVENTION

A device or system is known that is designed to read out, from a card with a customer's information recorded thereon such as a membership card, the recorded information and perform information providing according to the recorded information thus read out.

For example, Japanese Laid-Open Patent Publication No. H08-103549 discloses a customer management system that, by providing a customer service using a membership card, is aimed at effectively promoting an improvement of a customer attracting effect and at the same time, preventing an increase in a burden on a game hall due to a job of issuing an exchange ticket (a coupon) that is essential to the customer service.

In the customer management system of Japanese Laid-Open Patent Publication No. H08-103549, an input terminal reads out an ID code capable of identifying a pre-registered customer from the membership card and, if it judges that the membership card is proper, makes a monitor display pre-set information on the customer service. When an operation is performed to receive the customer service as displayed, the input terminal issues by a printer an exchange ticket necessary to receive the customer service and at the same time, sends data on such customer service to a point-of-sale terminal and a host computer.

In the customer management system of Japanese Laid-Open Patent Publication No. H08-103549, the information on the service available to an individual such as a predetermined service member is the information prearranged according to identifying information identifying the service member. In this case, the information provided in response to the identifying information is in a one-to-one relationship with the identifying information and the information provision according to the identifying information is not flexibly changeable.

For example, there is a system that, in providing information to the customer service member, firstly screen-displays a list of information available to the customer service member, etc. and then outputs by printing the information selected out of the displayed menu.

However, even in such a case, the prearranged information is the information arranged in a one-to-one relationship with the identifying information identifying the service member, etc., and it is merely so arranged that a user can select a particular piece of information out of such arranged information. Namely, the above conventional technology discloses no such system as designed to, at the time of providing some information according to the identifying information, offer a high degree of convenience to the user by flexibly changing the information to be provided, in consideration of the conditions in which the information is acquired such as the date and hour of use and the place of use.

SUMMARY OF THE INVENTION

It is an object of the present invention to provide an information processing system that provides some information according to identifying information read out from a recording medium storing the identifying information capable of identifying an individual, wherein it is so arranged that a high degree of convenience can be offered to a user by flexibly changing the information to be provided in consideration of acquiring conditions in which the identifying information is read out.

It is another object of the present invention to provide an information processing system comprising an identifying information reading portion that reads out the identifying information from a recording medium storing the identifying information capable of identifying an individual, an information managing portion that in advance manages and keeps information available for information providing, an information extracting portion that extracts the information from the information managing portion, based on the identifying information read out by the identifying information reading portion, and an information output portion that outputs the information extracted by the information extracting portion, wherein the information extracting portion selects and extracts the information to be provided out of prearranged information, based on the identifying information read out by the identifying information reading portion and the acquiring conditions of the identifying information.

It is a further object of the present invention to provide an information processing system, wherein the information extracting portion uses the date and hour when the identifying information is read out by the identifying information reading portion as the acquiring conditions and changes the information to be extracted according to the date and hour.

It is a further object of the present invention to provide an information processing system, wherein the information extracting portion uses, as the acquiring conditions, the number of times of a provision of information provided to a particular individual identified by the identifying information when the identifying information is read out by the identifying information reading portion, and the information extracting portion changes the information to be extracted according to the number of times of the provision of the information.

It is a further object of the present invention to provide an information processing system, wherein the information extracting portion uses characteristics of the place where the information processing system is disposed as the acquiring conditions, and the information extracting portion changes the information to be extracted according to the characteristics of the place.

It is a further object of the present invention to provide an information processing system, wherein the information extracting portion sets an order of priority to the information to be extracted according to private information identified by the identifying information and determines the information to be extracted according to the order of priority.

It is a further object of the present invention to provide an information processing system that is an image forming apparatus having a copying function and a printing function, wherein the information output portion enables print output of information by a printing portion realizing the printing function.

It is a further object of the present invention to provide an information processing system comprising an image forming apparatus and a server, wherein the image forming apparatus has at least the identifying information reading portion and the information output portion having a printing portion realizing a printing function, and the server is connected to the image forming apparatus by way of a communication line and has at least the information managing portion.

It is a further object of the present invention to provide an information processing system, wherein the image forming apparatus has a display portion for displaying information extracted by the information extracting portion and the information output portion outputs the extracted information, using either one or both of the display portion and the printing portion.

It is a further object of the present invention to provide an information processing system, wherein the information output portion, after displaying extracted information on a display portion, make a printing portion output information according to a predetermined input operation.

BRIEF DESCRIPTION OF THE DRAWINGS

FIG. 3 is a diagram for description of an example of information files to be managed by the information processing system according to the present invention;

PREFERRED EMBODIMENTS OF THE INVENTION

First Embodiment

Figure 1:
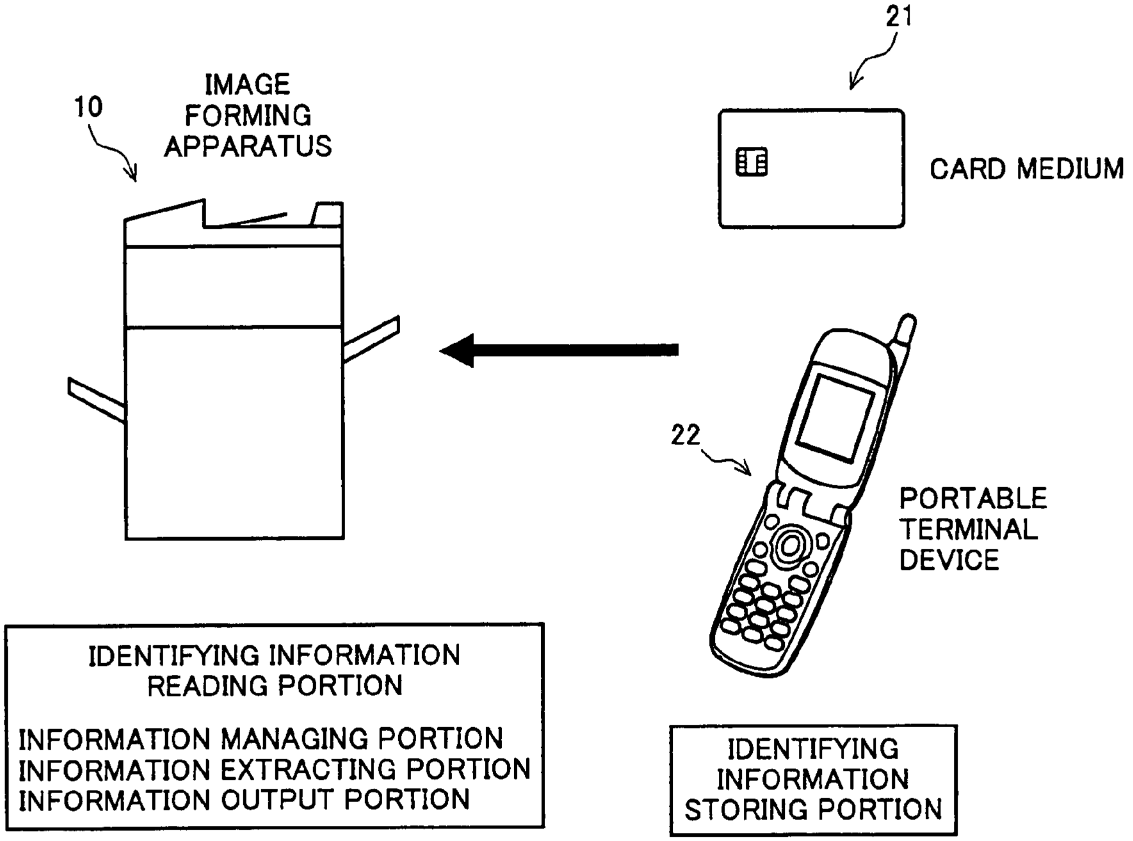
FIG. 1 is a diagram for description of an embodiment of an information processing system according to the present invention.

FIG. 1 is a diagram for description of an embodiment of an information processing system according to the present invention. The information processing system according to the present invention, by reading out identifying information from the identifying information capable of identifying an individual such as a predetermined service member, can output information according to such identifying information. In the present embodiment, a card medium 21 and a portable terminal device 22 can preferably be applied as a recording medium storing such identifying information.

The recording medium applied to the present invention is only required to be configured to store such identifying information and to allow such information to be read out by a predetermined means and the kind and the style thereof is not to be restricted. For example, a magnetic-recording card medium and a card medium in the form of an IC card can be applied as a card-type recording medium. The IC card may be of a contact type or a non-contact type. In the case of the portable terminal device, a cellular phone and a PDA can be applied.

Other than the above, various memory cards and disk-type recording media may be applied as the recording medium storing the identifying information. It may also be so arranged that the identifying information can be input by biometrics such as a fingerprint, a vein, a face, a voiceprint, and iris of pupil. In this case, the human body itself is interpreted as the recording medium storing the identifying information.

The identifying information is ID (identification) information of, for example, the owner of the medium and is such information that enables a system that acquires the ID to verify the ID by identifying private information input by the owner in advance.

The present embodiment uses an image forming apparatus 10 as an apparatus for reading out identifying information from the above recording medium and providing information based on the identifying information. The image forming apparatus 10 comprises an identifying information reading portion that reads out the identifying information from the card medium, etc., mentioned above, an information managing portion that in advance manages and keeps information available for information providing, an information extracting portion that extracts information to be provided from the information managing portion, based on the identifying information read out by the identifying information reading portion, and an information output portion that outputs the information extracted by the information extracting portion. Description will then be made of an example of a specific configuration thereof.

Figure 2:
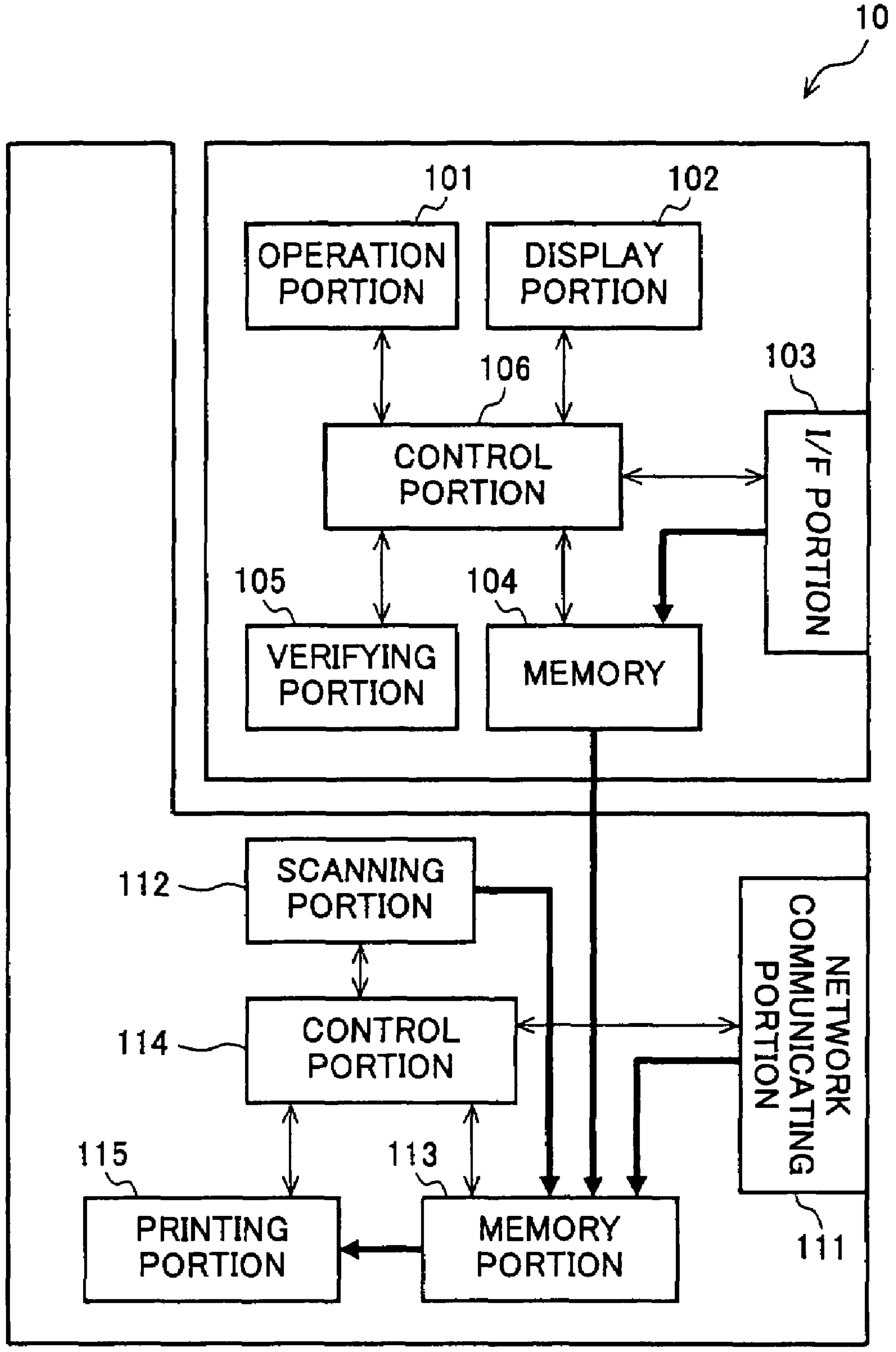
FIG. 2 is a block diagram for description of an internal configuration example of an image forming apparatus of FIG. 1.

FIG. 2 is a block diagram for description of an internal configuration example of the image forming apparatus of FIG. 1. The image forming apparatus has an I/F portion 103 for reading out the identifying information from the card medium and the portable terminal device such as the cellular phone. The I/F portion 103, being configured to be capable of acquiring the information from the specified recording medium, corresponds to the identifying information reading portion. The identifying information read out by the I/F portion 103 is kept in a memory 104 for use in verification of the identifying information.

An operation portion 101, composed of a group of hard keys such as a ten-key board and buttons, a touch-panel, etc., enables a user to make an input operation. A display portion 102, composed of a liquid crystal panel, etc., for displaying various information screens, can be made to function as one of the information output portion for outputting the information to be provided to the user.

A verifying portion 105, using the identifying information read out by the I/F portion 103 from the recording medium, verifies the identifying information. When the verifying portion 105 verifies the identifying information as being the identifying information for performing a predetermined information outputting to the user, the verifying portion 105 informs a control portion 106 accordingly. The control portion 106 controls the above elements.

A network communicating portion 111 constitutes an I/F with a predetermined communication network such as a public network and a LAN. Data acquired by the network communicating portion 111 from the communication network is kept in a memory portion 113. The memory portion 113 is a memorizing means such as an HDD and a ROM.

A scanning portion 112 acquires document image data by reading a document image and has the data memorized in the memory portion 113. A printing portion 115 is an information output portion for printing out data such as the document image data read by the scanning portion 112 and print data input from the outside by way of the network communicating portion 111. A control portion 114 controls these elements.

The memory portion 113 is an information managing portion that stores and manages the information to be provided to the user. The information stored in the memory portion 113 to be provided to the user may be the data taken in by the scanning portion 112 or may be the data provided by an external device by way of the network communicating portion 111 or may be the data input from a predetermined recording medium. The control portion 114 functions as an information extracting portion that extracts the information stored in the memory portion 113, based on the identifying information read out from the I/F portion 103 and the acquiring conditions of the identifying information. The control portion 114 makes the printing portion 115 or display portion 102 output the extracted information.

When, for example, a specified service provider provides a predetermined membership service, the verifying portion 105 verifies, based on the identifying information acquired from the I/F portion 103, whether the user who has input the identifying information is a member of the membership service.

The control portion 114 can extract, for example, service information from the memory portion 113 and output it, according to the information verifying that the user is a member of such membership service. Here, the control portion 114 can flexibly change contents of the information to be output according to the acquiring conditions of the identifying information. Specific examples of extracting processing of such output information will be described later.

In the case of outputting the information stored in the memory portion 113, the control portion 114 can have the information output, using either one or both of the display portion 102 and the printing portion 115 that constitute the information output portion. For example, the information extracted from the memory portion 113 may be output only for displaying on the display portion 102 or may be output for printing from the printing portion 115 without being displayed on the display portion 102 or may be displayed on the display portion 102 and at the same time, be output from the printing portion 115.

It may be so arranged that after the information available to the user is extracted from the memory portion 113 and is once displayed on the display portion 102, a whole or a part of the information displayed is printed out from the printing portion according to the user's selecting operation, etc. Or it may be so arranged that the information extracted from the memory portion 113 is displayed on the display portion 102 and is printed out from the printing portion 115 in the case of the user's operation to approve the printing out. In this case, the information to be displayed on the display portion 102 may be an excerpt, a summary, or thumbnail information of the information to be printed out.

FIG. 3 is a diagram for description of an example of information files to be managed by the information processing system according to the present invention. In the memory portion 113 of the image forming apparatus 10, the information available to the user is managed in the form of files based on the identifying information read out from the user's recording medium.

For example, files of newspapers, books, leisure, sightseeing, evens, store's campaign information, etc., are kept and managed. The newspaper file keeps article information of newspapers a, b, c, . . . . The book file keeps information on various books I, RO, HA, . . . . Such information is an introduction or a review of the book or information partially extracted from the book.

The leisure file keeps information on leisure on the weekend or information on leisure of this month. Or the information may be leisure information arranged according to categories of leisure or may be information on the leisure near the place of installation of the image forming apparatus.

The sightseeing file keeps information on sightseeing places such as Osaka, Kyoto, and Nara. Or the information may be information on the sightseeing near the place of installation of the image forming apparatus.

The event file keeps information on events on the weekend or information on events of this month. The information may be event information arranged according to kinds of events, for example, such kinds of events as concerts and art exhibitions or may be information on events near the place of installation of the image forming apparatus, for example, information on a summer festival in the neighborhood.

The store's campaign information file keeps information on the store A, store B, store C, The store information may be information on the campaign by the store near the place of installation of the image forming apparatus or may be information on stores in the sightseeing places or leisure time amusement places.

While, as seen above, files of information to be provided to the user are kept in the memory portion 113 of the image forming apparatus 10, the information to be provided, of course, is not limited to these pieces of information, but various types of information as may be appropriate can be kept according to the needs of the users and the information providers.

The information processing system according to the present embodiment can be applied to various kinds of information providing services, as seen above. In such a case, the image forming apparatus 10 according to the present embodiment is disposed, for example, at convenience stores or stores in railway stations and service providing is executed according to a contract between a service provider and a user.

For example, the user concludes a service providing contract with the service provider in advance. Then, the user obtains an ID (identifying information) provided by the service provider and has the ID stored in the card medium or the portable terminal device. The service provider makes the memory 104 keep verifying information of the ID so that the verifying portion 105 can verify when the ID is input.

For example, every morning, when the user comes to the place of installation of the image forming apparatus 10 and inputs the ID by a predetermined method, the image forming apparatus 10 prints out the newspaper a. In this case, the image forming apparatus 10 has the input ID verified by the verifying portion 105 and, if the service contract turns out to be effective as a result of the verification, extracts predetermined information out of the information stored in the memory portion 113 according to conditions pre-registered in the ID and prints the information at the printing portion 115. Here, as described above, after the information is displayed on the display portion 102 or the information available to the user is displayed on the display portion 102, the printing portion 115 prints out according to the selecting operation, etc., by the user.

The above service provider can make the image forming apparatus 10 keep in advance the information files to be kept by the image forming apparatus 10. It is conceivable that stores and event sponsors provide the information to such service provider. The service provider sends the information to the image forming apparatus 10, using the communication network or has the information directly read by the scanning portion of each image forming apparatus 10. Here, it may be so arranged that such information as the newspaper information will periodically be distributed to the image forming apparatus. It is also conceivable that not only such service provider but also various organizations such as the stores and the event sponsors have the information directly read and kept by the image forming apparatus 10.

Description will then be made of processing of extracting the information kept by the image forming apparatus 10.

When the image forming apparatus 10 provides the information according to the user's identifying information as described above, the present invention is designed so that the extracting conditions of the information to be provided is changed in consideration of not only the user's identifying information but also the conditions of acquiring the identifying information by the image forming apparatus 10.

For example, the date and hour when the I/F portion 103 of the image forming apparatus 10 reads out the identifying information from the recording medium held by the user can be used as the acquiring conditions, and the information to be extracted can be flexibly changed according to such date and hour.

For example, every morning, when the user comes to the place of the image forming apparatus 10 and inputs the ID by a predetermined method, the image forming apparatus 10 prints out a morning edition of the newspaper of the day. When the user inputs the ID to the image forming apparatus 10 in the evening on a weekday, the image forming apparatus 10 prints out the information on the store nearby most convenient for the user on his way back from work, etc., or evening paper information of the day, etc. When the ID is input on holidays, the image forming apparatus 10 preferentially extracts and prints out the leisure information and the event information.

As seen above, by using the date and hour when the identifying information is read out as the acquiring conditions of the identifying information to be used by the image forming apparatus 10 for extracting the information, the information to be provided can flexibly be changed according to the date and hour, resulting in improved quality of the service provided to the user. On the part of the user, optimum information can be obtained according to the user's needs, etc.

In this case, the user can specify in advance the order of priority of contents of the information to be provided. Namely, the order of priority of the information to be provided by the image forming apparatus 10 to the user can be determined for respective users according to the identifying information of the users. Such user information is memorized in advance in the memory 104 or the memory portion 113 and when the control portion 114 extracts the information to be provided to the user from the memory portion 113, the information to be extracted is selected according to the memorized user information.

For example, when the user makes registration so that the newspaper b will be output in a predetermined time zone of the morning and that the information on leisure in the neighborhood will be output in the time zone of holiday morning, the image forming apparatus 10 can extract the information related to the registered information, based on the date and hour information when the identifying information is acquired and output the information at the printing portion 115 or on the display portion 102.

Another example of the acquiring conditions of the information by the image forming apparatus 10 is the use by the I/F portion 103 of the image forming apparatus 10 of the number of times the information has been provided to a particular individual identified by the identifying information. The information to be extracted is changed according to such number of times.

In this case, the image forming apparatus 10 counts and keeps, for example, the number of times per day the information providing service is used, with respect to the particular individual identified by the identifying information. The information to be provided is changed according to the number of times per day the service is used.

It can be so arranged that, for example, when a particular individual uses the information providing service for the first time on a day, the image forming apparatus 10 outputs the newspaper information and when the service is used for the second time on the day, the image forming apparatus 10 outputs the information on leisure in the neighborhood and when the service is used for the third time on the day, the image forming apparatus 10 outputs the store information.

In this case as well, the user can specify in advance the order of priority of the information to be provided. Namely, the order of priority of the information to be provided by the image forming apparatus 10 to the user can be determined for respective users according to the identifying information of the users.

As seen above, by using the number of times the identifying information is read out as the acquiring conditions of the identifying information, there is no possibility that, for example, same information can be output to same user throughout a day and the quality can be improved of the service provided to the user. On the part of the user, optimum information can be obtained according to the user's needs, etc.

Furthermore, conditions of the place where the image forming apparatus 10 is disposed can be used as other acquiring conditions of the information by the image forming apparatus 10. The information to be extracted can be changed according to the conditions of the place.

It is so arranged that the image forming apparatus 10 disposed, for example, in an office street outputs mainly business information such as financial information, economic information, and technical trend information and that the image forming apparatus 10 disposed, for example, in a sightseeing place outputs mainly sightseeing information. Or it can be so arranged that the image forming apparatus 10 disposed in a convenience store in front of a school outputs school event information and that the image forming apparatus 10 disposed near a shopping street outputs bargain sale information, etc.

In this case as well, the user can specify in advance the order of priority of the information to be provided. Namely, the order of priority of the information to be provided by the image forming apparatus 10 to the user can be determined for respective users according to the identifying information of the users.

As seen above, by using the conditions of the place where the image forming apparatus 10 is disposed as the acquiring conditions of the identifying information, the information to be provided can be flexibly changed according to characteristics of or environments around the place where the image forming apparatus is disposed, resulting in improved quality of the service provided to the user. On the part of the user, optimum information can be obtained according to the user's needs, etc.

Additionally, it is also conceivable to change the information to be extracted according to, for example, the performance of the printing function of the image forming apparatus. For example, if the image forming apparatus has a printing function capable of a high-resolution color print, the information is provided in a color picture image and if the apparatus has a comparatively low level printing function, the information is provided only in text and characters. By managing as above, the information useful and appropriate for the user can be provided. Namely, it may be so arranged that the quality level of the printing function possessed by the image forming apparatus that has acquired the identifying information is added as the acquiring conditions of the identifying information.

Figure 4:
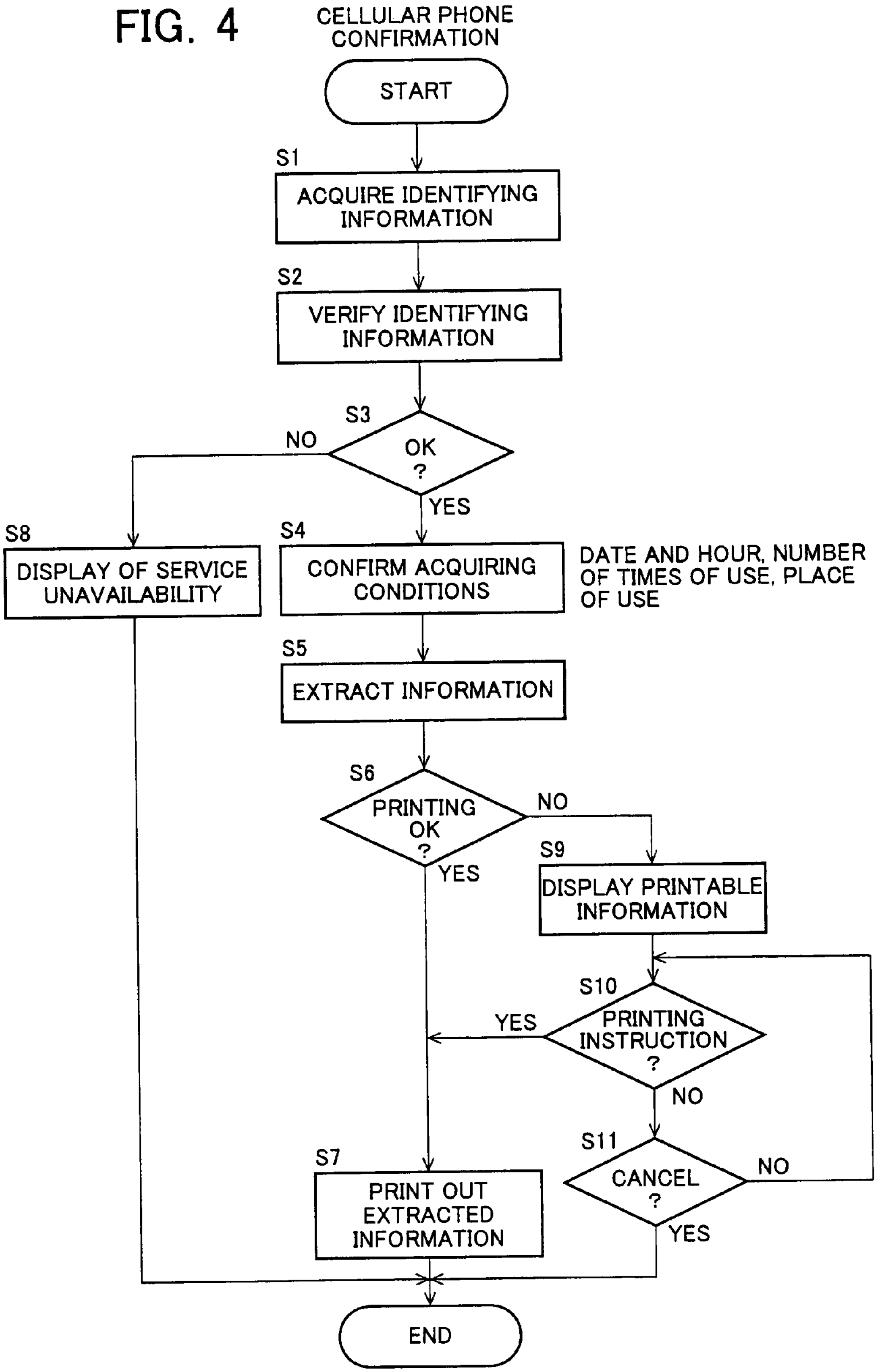
FIG. 4 is a flow chart for description of an example of information outputting processing in the information processing system according to the present invention.

FIG. 4 is a flow chart for description of an example of information outputting processing in the information processing system according to the present invention and describes the example of processing to be executed by the image forming apparatus in the above embodiment.

The image forming apparatus firstly acquires the identifying information from the card medium or the portable terminal device carried by the user (step S1). The identifying information is a member's ID, etc., of a predetermined membership service, as described above. Then, the image forming apparatus verifies the identifying information (step S2), and confirms whether the identifying information is entitled to receive the information providing service (step S3).

If the identifying information is not entitled to receive the information providing service, then the image forming apparatus displays accordingly on the display portion (step S8). Here, the image forming apparatus may display not only the unavailability of the service but also guidance to the effect that various information providing services are available by joining this membership service.

On the other hand, at step S3, if the identifying information is the identifying information of a member of this membership service, then the image forming apparatus confirms the acquiring conditions of the identifying information (step S4). Used as the acquiring conditions are, as described above, the date and hour when the user uses the information providing service, the number of times the service is used by the user identified by the identifying information, the place of use (place where the image forming apparatus is disposed), etc. Then, the image forming apparatus extracts the information to be provided to the user, out of the information stored in advance, according to the acquiring conditions thus confirmed (step S5).

The image forming apparatus then judges whether to immediately print out the extracted information (step S6). For example, if the setting is so made as to print out the extracted information only after it is displayed on the display portion of the image forming apparatus, then the extracted information can not be printed out immediately. Here, if printing out is OK, then the image forming apparatus prints out the extracted information (step S7).

At step S6, if printing out is not OK, then the image forming apparatus displays the information available for printing on the display portion (step S9). If a printing instruction is input for all information displayed or particular information selected (step S10: Yes), then the image forming apparatus prints out the extracted information thus instructed (step S7).

If no printing instruction is input for the displayed information (step S10: No), then the image forming apparatus judges whether a print canceling instruction is input (step S11) and ends the processing if the printing is cancelled and waits for the printing instruction at step S10 if the printing is not cancelled.

Second Embodiment

Figure 5:
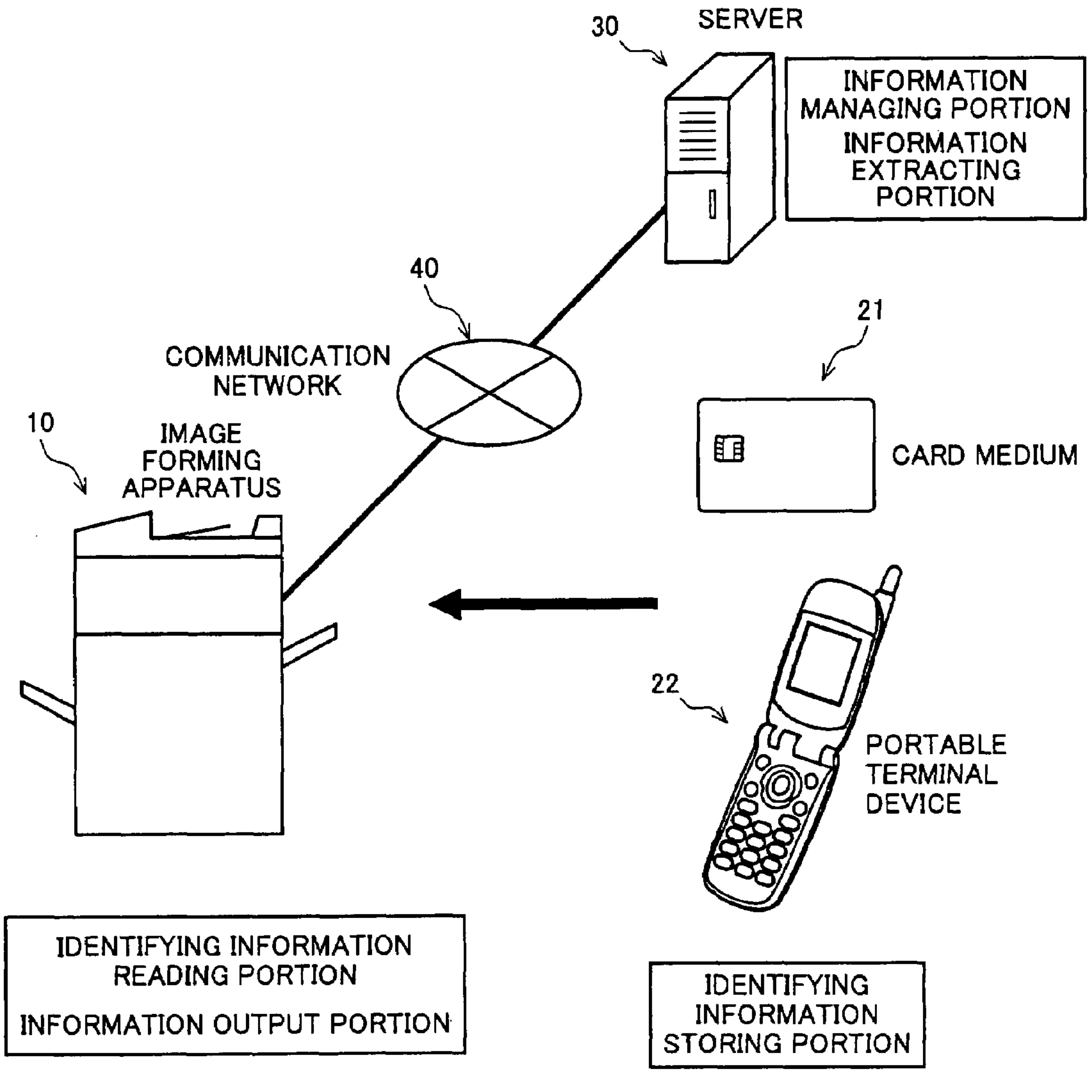
FIG. 5 is a diagram for description of other embodiment of the information processing system according to the present invention.

FIG. 5 is a diagram for description of other embodiment of the information processing system according to the present invention. In the first embodiment, the image forming apparatus 10 alone performs the processing of keeping the information to be provided to the user, reading out the identifying information from the recording medium held by the user, and extracting and outputting the information based on the identifying information. In contrast, in the second embodiment, the information processing system according to the present invention is enabled by the image forming apparatus 10 and a server 30 connected to the image forming apparatus 10 by way of a communication network 40.

In the present embodiment, the server 30 is equipped with the information managing portion that manages and keeps the information available to the user and the information extracting portion that extracts the information from the information managing portion based on the identifying information read out from the recording medium.

The image forming apparatus 10 has the identifying information reading portion that reads out the identifying information of the user from the recording medium such as the card medium 21 and the portable terminal device 22 and sends the identifying information read out by the identifying information reading portion to the server 30 by way of the communication network 40. The information extracting portion of the server 30 verifies the identifying information sent from the image forming apparatus 10, extracts the information to be provided to the user from the information managing portion according to the result of the verification, and sends the extracted information to the image forming apparatus 10 by way of the communication network 40.

The image forming apparatus 10 has the information output portion using the copying function of printing out a document image read by the scanning portion and the printing function of printing out the information input by external devices, etc., and appropriately outputs the information extracted by the information extracting portion of the server 30.

In this case, the verifying portion that verifies the identifying information read out by the identifying information reading portion is provided in the server 30, but may be provided in the image forming apparatus 10 as shown in FIG. 2. In such a case, the verifying portion 105 of the image forming apparatus verifies the identifying information read out by the I/F portion 103, in the same way as in the first embodiment. If the verification is successful, the image forming apparatus 10 sends the identifying information to the server 30 for extraction of the information.

Furthermore, in the present embodiment, the server may be so configured as to be separated into a verifying server that performs only the verification of the identifying information read out by the image forming apparatus 10 and an information managing server that performs the information management. In this case, the identifying information read out by the image forming apparatus 10 is sent to the verifying server, the result of the verification is sent back to the image forming apparatus 10, and the image forming apparatus 10 sends the identification information whose verification is successful to the information managing server. Or it may be so arranged that the verifying server sends the identifying information and the result of verification directly to the information managing server. Then, the information managing server extracts the information to be provided to the user based on the identifying information thus verified and sends it to the image forming apparatus 10.

It may be so arranged that the information extracting portion that extracts the information managed and kept in the server 30 will be provided in the image forming apparatus 10 rather than in the server 30. In this case, the image forming apparatus 10 accesses the information files managed and kept in the server 30, extracts the information under predetermined conditions according to the verified identifying information, and has the information transferred from the server 30 to the image forming apparatus 10.

Namely, in the present embodiment, the same operation as performed by the image forming apparatus 10 in the first embodiment is performed by the image forming apparatus 10 and the server 30 working together. In the present embodiment, since the information to be provided to the user is managed by the server 30, same information can appropriately be provided to a plurality of image forming apparatuses 10 connected thereto by way of the communication network 40. Since the state of usage by the user can collectively be managed by the server 30, the number of times the service is used can reliably be managed even if different image forming apparatuses 10 are used by one user.

As seen above, the information processing system according to the present embodiment is configured so that essentially, the function of the first embodiment is distributed among and held by the image forming apparatus 10, the server 30, and other servers, etc., as required. Therefore, the example of application of the recording medium, the example of the information files to be managed, the conditions of extracting the information, the procedure of the information outputting processing, etc., are same as in the first embodiment and the repetition of the same description is omitted here.

Figure 6:
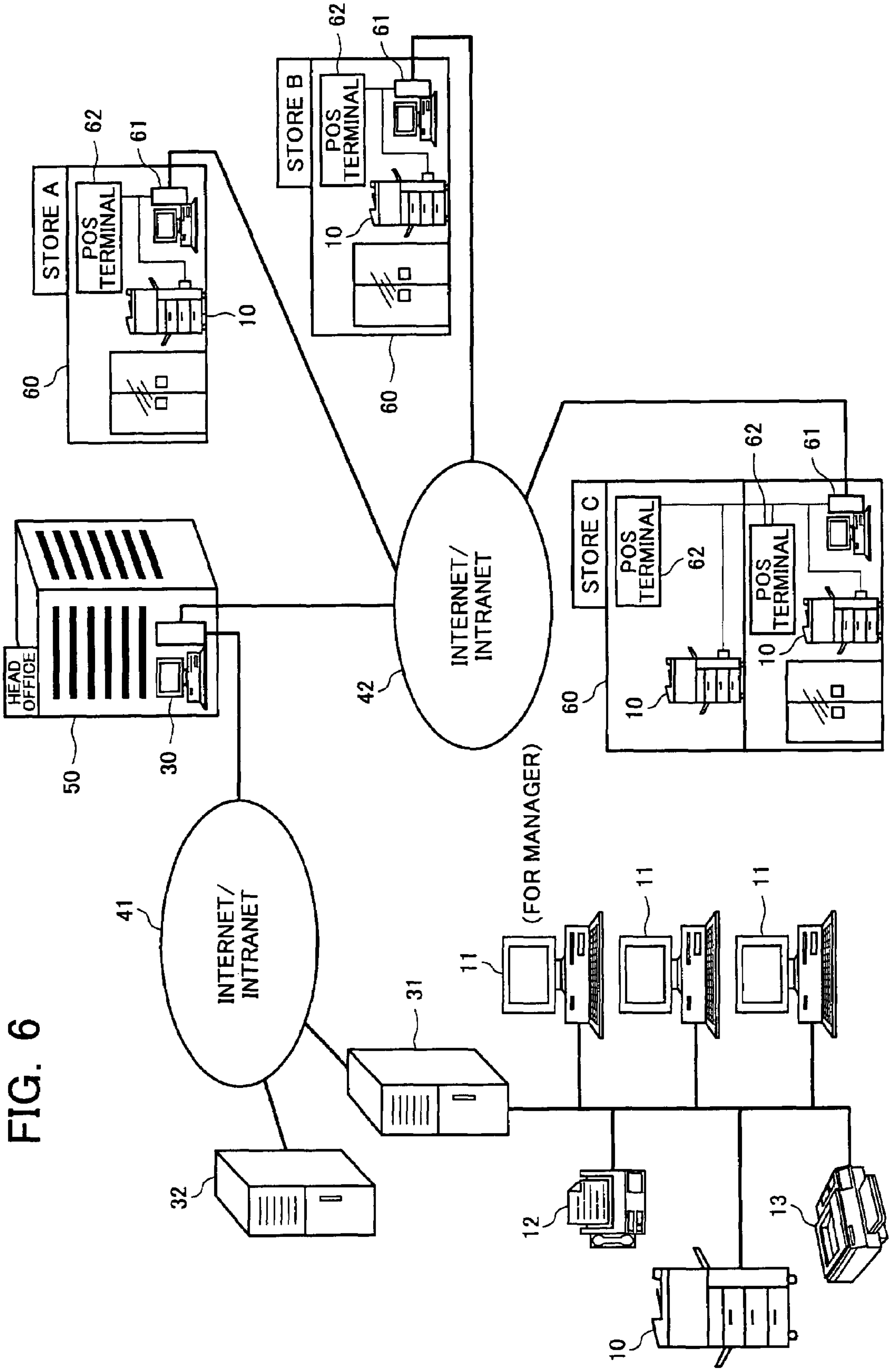
FIG. 6 is a diagram for description of an operation example of an information providing service using the information processing system according to the present invention.

FIG. 6 is a diagram for description of an operation example of an information providing service using the information processing system according to the present invention. Shown here is a configuration example of a network system for providing management information kept and managed by the server to the image forming apparatus connected thereto by way of the communication line.

The information providing service by a membership service system is operated by a head office 50. The server 30 for operating this information providing service is disposed in the head office 50.

For example, the server 30 connects with servers 31 and 32 by way of Internet/Intranet 41 and the server 31 connects with a network system based on an in-house LAN, etc. For example, a plurality of PCs 11, a fax 12, a printer 13, and the image forming apparatus 10 are connected to this network system.

The server 30 connects with PC terminals 61 of a plurality of convenience stores (store A, store B, and store C) 60. The PC terminal 61 functions as a server within a store and connects not only with the image forming apparatus 10 but also with a POS terminal 62, etc.

In the configuration example as described above, the above information outputting processing of the image processing system according to the present invention is enabled by the image forming apparatus 10 disposed in the in-house LAN network system and the convenience stores. Namely, the image forming apparatus 10 is equipped with at least the identifying information reading portion that reads out the identifying information stored in the card medium and the portable terminal device and the information output portion that outputs the information extracted based on the identifying information and the user can use the information outputting service by visiting the image forming apparatus 10 as required by the circumstances.

The information managing portion that keeps and manages the information to be provided to the user is provided in the server 30 of the head office 50. The information managing portion may be provided in other server 32, etc. The function of verifying the identifying information can also be provided in the server 30 of the head office 50 or other server 32 as required by the circumstances. Even in this type of configuration by way of the network, the image forming apparatus 10 may be configured to have the information managing portion and the verifying portion as in the first embodiment.

The user can use the information providing service on the image forming apparatus 10 at any arbitrary location. Appropriate information is extracted and output to the image forming apparatus 10 according to the date and hour of the use, the number of times of usage, the place where the image forming apparatus 10 is disposed, the order of priority of the information to be provided as registered by the user, etc. In this case, the state of usage by the user is managed by the server 30 of the head office 50. Therefore, even when, for example, the user uses the information providing service on the image forming apparatuses 10 at different locations within a day, it is ensured that the information is provided according to the number of times the service is used.

The following effect can be obtained according to the present invention.

In the information processing system that performs certain information providing according to the identifying information read out from the recording medium storing the identifying information capable of identifying the individual, a high degree of convenience can be given to the user by flexibly changing the information to be provided in consideration of the acquiring conditions under which the identifying information is read out.

The invention claimed is:

1. An information processing system comprising:

an identifying information reading portion that reads out identifying information from a recording medium storing the identifying information capable of identifying an individual;

an information managing portion that in advance manages and keeps information available for information providing, the available information being managed in a plurality of files corresponding to different categories of information available to the individual;

an information extracting portion that extracts information from the information managing portion, based on the identifying information read out by the identifying information reading portion; and an information output portion, that outputs the information extracted by the information extracting portion, wherein the information extracting portion selects and extracts the information to be provided out of the available information, based on the identifying information read out by the identifying information reading portion and acquiring conditions of the identifying information.

2. The information processing system as defined in claim 1, wherein the information extracting portion uses date and hour when the identifying information is read out by the identifying information reading portion as the acquiring conditions and changes the information to be extracted according to the date and hour.

3. The information processing system as defined in claim 1, wherein the information extracting portion uses, as the acquiring conditions, the number of times of a provision of information provided to a particular individual identified by the identifying information when the identifying information is read out by the identifying information reading portion, and the information extracting portion changes the information to be extracted according to the number of times of the provision of the information.

4. The information processing system as defined in claim 1, wherein the information extracting portion uses characteristics of the place where the information processing system is disposed as the acquiring conditions, and the information extracting portion changes the information to be extracted according to the characteristics of the place.

5. The information processing system as defined in claim 1, wherein the information extracting portion sets an order of priority to the information to be extracted according to private information identified by the identifying information and determines the information to be extracted according to the order of priority.

6. The information processing system as defined in claim 1, wherein the information processing system is an image forming apparatus having a copying function and a printing function, wherein the information output portion enables print output of information by a printing portion realizing the printing function.

7. The information processing system as defined in claim 6, wherein the image forming apparatus has a display portion for displaying information extracted by the information extracting portion, wherein the information output portion outputs the extracted information, using either one or both of the display portion and the printing portion.

8. The information processing system as defined in claim 7, wherein the information output portion, after displaying the extracted information on the display portion, makes the printing portion output information according to a predetermined input operation.

9. The information processing system as defined in claim 1, comprising an image forming apparatus and a server, wherein the image forming apparatus has at least the identifying information reading portion and the information output portion having a printing portion realizing a printing function, and the server is connected to the image forming apparatus by way of a communication line and has at least the information managing portion.

10. The information processing system as defined in claim 9, wherein the image forming apparatus has a display portion for displaying information extracted by the information extracting portion, wherein the information output portion outputs the extracted information, using either one or both of the display portion and the printing portion.

11. The information processing system as defined in claim 10, wherein the information output portion, after displaying the extracted information on the display portion, makes the printing portion output information according to a predetermined input operation.

* * * * *